US012809072B2

(12) United States Patent
Guimard et al.

(10) Patent No.: US 12,809,072 B2
(45) Date of Patent: Nov. 24, 2026

(54) MATERIAL COMPRISING A FUNCTIONAL MONOLAYER STACK WITH A DIELECTRIC LAYER OF ALUMINUM- AND SILICON-BASED NITRIDE, AND GLAZING COMPRISING THIS MATERIAL

(71) Applicant: SAINT-GOBAIN GLASS FRANCE, Courbevoie (FR)

(72) Inventors: Denis Guimard, Aubervilliers (FR); Adnan Moustafa, Aubervilliers (FR); David Peyrot, Aubervilliers (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 226 days.

(21) Appl. No.: 18/725,556

(22) PCT Filed: Dec. 16, 2022

(86) PCT No.: PCT/EP2022/086330
§ 371 (c)(1),
(2) Date: Jun. 28, 2024

(87) PCT Pub. No.: WO2023/126213
PCT Pub. Date: Jul. 6, 2023

(65) Prior Publication Data

US 2025/0067916 A1 Feb. 27, 2025

(30) Foreign Application Priority Data

Dec. 29, 2021 (FR) ....................................... 2114644

(51) Int. Cl.
*G02B 5/28* (2006.01)
*C03C 17/36* (2006.01)
(Continued)

(52) U.S. Cl.
CPC .......... *G02B 5/282* (2013.01); *C03C 17/3626* (2013.01); *C03C 17/3644* (2013.01);
(Continued)

(58) Field of Classification Search
CPC .. C03C 17/36–3636; C03C 17/3642–17/3697; G02B 5/28–5/282; G02B 1/115
See application file for complete search history.

(56) References Cited

U.S. PATENT DOCUMENTS 5,543,924 A 8/1996 Surowiec
5,935,702 A * 8/1999 Macquart .......... B32B 17/10174 428/673

(Continued)

FOREIGN PATENT DOCUMENTS

EP 0 718 250 A2 6/1996
WO WO 2005/000578 A2 1/2005

(Continued)

OTHER PUBLICATIONS

International Search Report as issued in International Patent Application No. PCT/EP2022/086330, dated Mar. 6, 2023.

*Primary Examiner* — Prashant J Khatri
(74) *Attorney, Agent, or Firm* — CUSHMAN PARTNERS LLC

(57) ABSTRACT

A material includes a substrate coated on one face with a stack of thin layers including a single metallic functional layer and two anti-reflective coatings, wherein an anti-reflective coating located further from the face than a functional layer includes a dielectric layer of nitride based on aluminum and silicon $Al_xSi_yN_z$ with an atomic ratio of aluminum relative to the total aluminum and silicon of between 91.0% and 55.0%, and at least one upper dielectric layer, of nitride and/or oxide and located further from the face than the dielectric layer of nitride based on aluminum and silicon $Al_xSi_yN_z$, and/or of nitride and located closer to (Continued)

the face than the dielectric layer of nitride based on aluminum and silicon $Al_xSi_yN_z$.

20 Claims, 5 Drawing Sheets

(51) Int. Cl.
*E06B 3/67* (2006.01)
*E06B 9/24* (2006.01)

(52) U.S. Cl.
CPC ........ *C03C 17/3649* (2013.01); *C03C 17/366* (2013.01); *C03C 17/3681* (2013.01); *E06B 3/6715* (2013.01); *E06B 9/24* (2013.01); *C03C 2217/212* (2013.01); *C03C 2217/216* (2013.01); *C03C 2217/256* (2013.01); *C03C 2217/261* (2013.01); *C03C 2217/281* (2013.01); *C03C 2217/734* (2013.01); *C03C 2218/155* (2013.01); *E06B 2009/2417* (2013.01)

(56) References Cited

U.S. PATENT DOCUMENTS

2006/0240266 A1* 10/2006 Schicht ............... C03C 17/3634
428/432
2011/0262694 A1* 10/2011 Janssen ............... C03C 17/3435
427/160
2014/0198389 A1* 7/2014 Laurent ............... C03C 17/3626
359/585
2014/0211332 A1* 7/2014 Krasnov ............. C03C 17/3649
359/838
2014/0308528 A1* 10/2014 Ding ................... C03C 17/3613
204/192.27

FOREIGN PATENT DOCUMENTS

WO WO 2010/043828 A1 4/2010
WO WO 2014/116551 A1 7/2014
WO WO-2015030549 A1 * 3/2015 ......... C03C 17/3618

* cited by examiner

[Fig. 1]
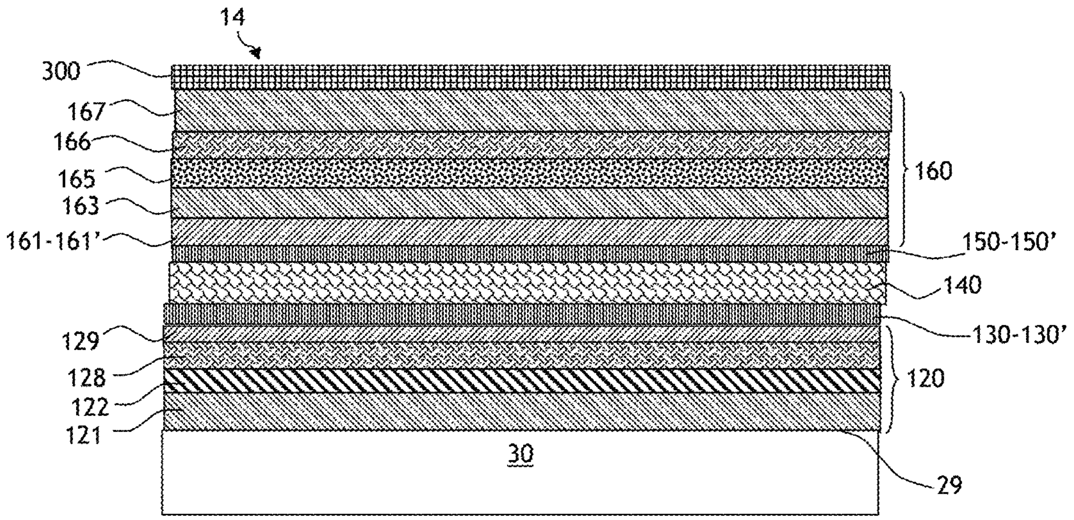
[Fig. 2]
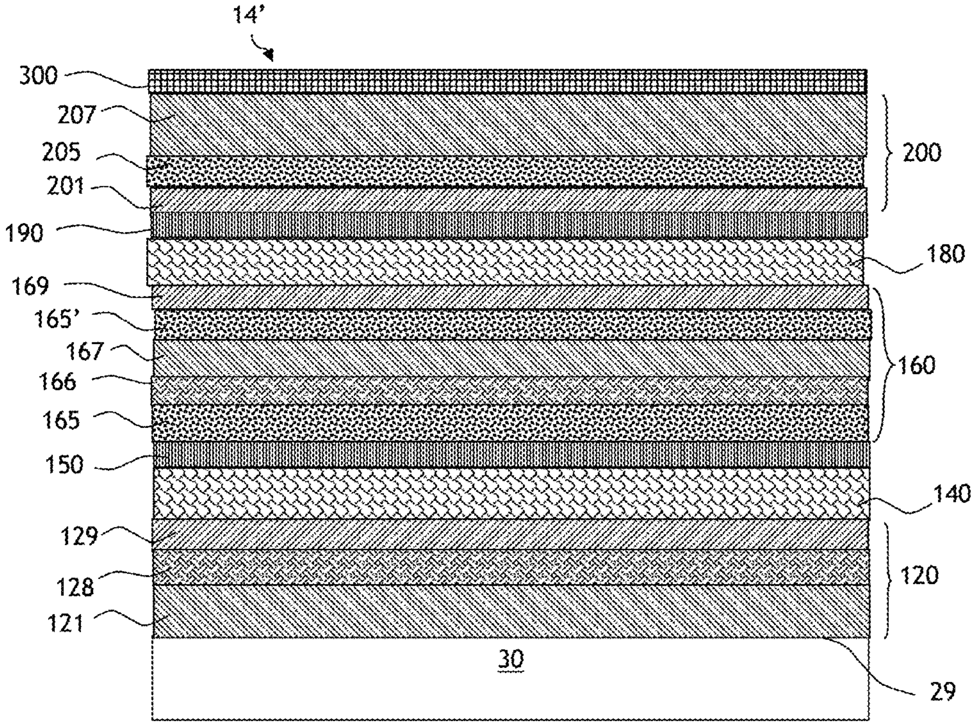

[Fig. 3]
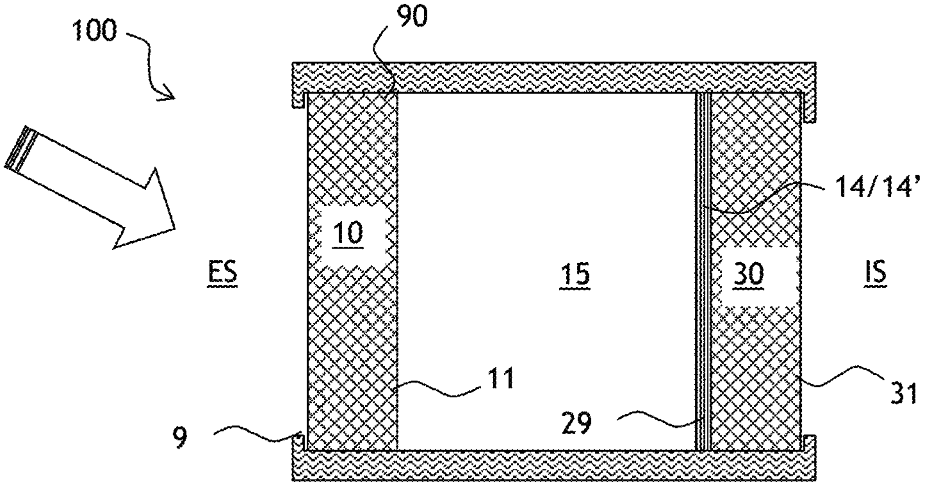
[Fig. 4]
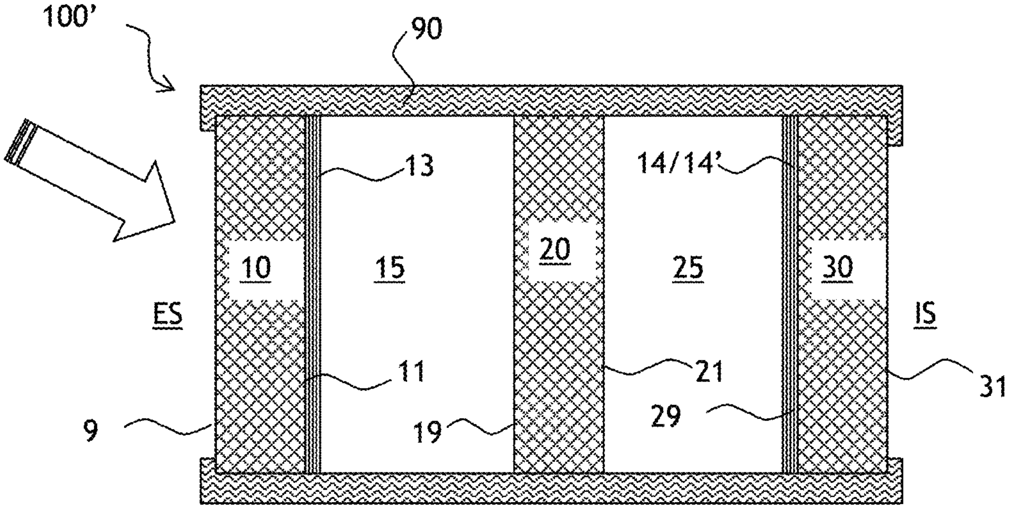
[Fig. 5]
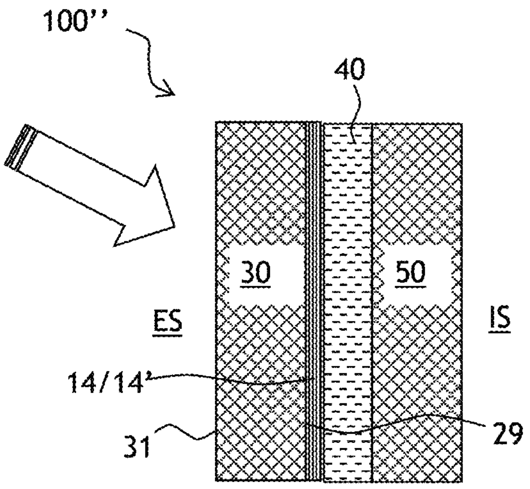

[Fig. 6]

| | | Ex. 1 | Ex. 2 | Ex. 3 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|
| 300 | $TiO_2$ | 2 | 2 | - | 2 | - | 2 | 2 | 2 | 2 | 2 | 2 | 2 |
| 167 | $Si_3N_4$ | 40 | 40 | 40 | 35 | 35 | 30 | 25 | 25 | 20 | 15 | 10 | - |
| 165 | $Al_xSi_yN_z$ | - | - | - | 5 | 5 | 10 | 15 | 15 | 20 | 25 | 30 | 35 |
| 163 | $Si_{y'}N_{Z'}$ | - | - | - | - | - | - | - | - | - | - | - | 5 |
| 161 | ZnO | 5 | 5 | 5 | 5 | 5 | 5 | 5 | 5 | 5 | 5 | 5 | 5 |
| 150 | NiCr | 0.7 | 0.7 | 0.3 | 0.7 | 0.7 | 0.7 | 0.7 | 0.3 | 0.7 | 0.7 | 0.7 | 0.7 |
| 140 | Ag | 10 | 10 | 10 | 10 | 10 | 10 | 10 | 10 | 10 | 10 | 10 | 10 |
| 130 | NiCr | - | 0.5 | - | - | - | - | - | - | - | - | - | - |
| 129 | ZnO | 5 | 5 | 5 | 5 | 5 | 5 | 5 | 5 | 5 | 5 | 5 | 5 |
| 128 | $Sn_iZn_jO$ | 5 | 5 | 5 | 5 | 5 | 5 | 5 | 5 | 5 | 5 | 5 | 5 |
| 121 | $Si_{y'}N_{Z'}$ | 25 | 25 | 25 | 25 | 25 | 25 | 25 | 25 | 25 | 25 | 25 | 25 |

[Fig. 7]

| | | Ex. 21 | Ex. 22 | Ex. 25 | Ex. 29 |
|---|---|---|---|---|---|
| 300 | $TiO_2$ | 2 | 2 | 2 | 2 |
| 167 | $Si_{y'}N_{Z'}$ | 35 | 30 | 20 | 20 |
| 166 | $Sn_iZn_jO$ | - | - | - | 10 |
| 165 | $Al_xSi_yN_z$ | 5 | 10 | 20 | 10 |
| 161 | ZnO | 5 | 5 | 5 | 5 |
| 140 | Ag | 10 | 10 | 10 | 10 |
| 129 | ZnO | 5 | 5 | 5 | 5 |
| 128 | $Sn_iZn_jO$ | 5 | 5 | 5 | 5 |
| 121 | $Si_{y'}N_{Z'}$ | 25 | 25 | 25 | 25 |

[Fig. 8]

| | | Ex. 4 | Ex. 4' | Ex. 33 | Ex. 34 | Ex. 5 | Ex. 35 |
|---|---|---|---|---|---|---|---|
| 300 | TiOx | 1 | 1 | 1 | 1 | 1 | 1 |
| 167 | $Si_3N_4$ | 40 | 40 | 20 | 10 | 40 | 20 |
| 165 | $Al_xSi_yN_z$ | - | - | 20 | 20 | - | 20 |
| 161' | ZnO' | 5 | - | - | | 5 | |
| 161 | ZnO | - | - | - | 5 | - | 5 |
| 150' | TiOx' | - | 4 | 4 | 4 | - | - |
| 150 | TiOx | - | 1 | 1 | 1 | - | - |
| 140 | Ag | 10 | 10 | 10 | 10 | 10 | 10 |
| 130' | ZnO' | - | - | - | - | 3 | 3 |
| 130 | NiCrOx | - | - | - | - | 1 | 1 |
| 129 | ZnO | 5 | 5 | 5 | 5 | 2 | 2 |
| 122 | SiZr27N | 15 | 15 | 15 | 15 | 15 | 15 |
| 121 | $Si_{y'}N_{z'}$ | 15 | 15 | 15 | 15 | 15 | 15 |

[Fig. 9]

| | | Ex. 6 | Ex. 41 | Ex. 42 | Ex. 43 | Ex. 44 | Ex. 45 | Ex. 46 | Ex. 47 | Ex. 48 | Ex. 49 |
|---|---|---|---|---|---|---|---|---|---|---|---|
| 300 | $TiO_2$ | 2 | 2 | 2 | 2 | 2 | 2 | 2 | 2 | 2 | 2 |
| 207 | $Si_{y'}N_{z'}$ | 24 | 24 | 24 | 24 | 24 | - | - | - | 24 | 24 |
| 205 | $Al_xSi_yN_z$ | - | - | - | - | - | 24 | 24 | 24 | - | - |
| 201 | ZnO | 5 | 5 | 5 | 5 | 5 | 5 | 5 | 5 | 5 | 5 |
| 190 | NiCr | 0.7 | 0.7 | 0.7 | 0.7 | 0.7 | 0.7 | 0.7 | 0.7 | 0.7 | 0.7 |
| 180 | Ag | 14 | 14 | 14 | 14 | 14 | 14 | 14 | 14 | 14 | 14 |
| 169 | ZnO | 5 | 5 | 5 | 5 | 5 | 5 | 5 | 5 | 5 | 5 |
| 165' | $Al_xSi_yN_z$ | - | - | - | - | 32 | - | - | - | 10 | 10 |
| 167 | $Si_{y'}N_{z'}$ | 79 | - | 39 | - | - | 79 | - | - | 59 | - |
| 166 | $Sn_iZn_jO$ | - | - | - | 15 | 15 | - | - | 15 | - | 59 |
| 165 | $Al_xSi_yN_z$ | - | 79 | 39 | 64 | 32 | - | 79 | 64 | 10 | 10 |
| 150 | NiCr | 0.7 | 0.7 | 0.7 | 0.7 | 0.7 | 0.7 | 0.7 | 0.7 | 0.7 | 0.7 |
| 140 | Ag | 10 | 10 | 10 | 10 | 10 | 10 | 10 | 10 | 10 | 10 |
| 129 | ZnO | 5 | 5 | 5 | 5 | 5 | 5 | 5 | 5 | 5 | 5 |
| 128 | SnZnO | 5 | 5 | 5 | 5 | 5 | 5 | 5 | 5 | 5 | 5 |
| 121 | $Si_{y'}N_{z'}$ | 21 | 21 | 21 | 21 | 21 | 21 | 21 | 21 | 21 | 21 |

[Fig. 10]

| | T (at %) | P (W) | Ar (sccm) | $N_2$ (sccm) | $O_2$ (sccm) | P' (μbar) |
|---|---|---|---|---|---|---|
| Ag | Ag | 210 | 40 | 0 | 0 | 8 |
| NiCr | Ni:80, Cr:20 | 70 | 20 | 0 | 0 | 2 |
| $Si_{y'}N_{z'}$ | Si:98, Al:2 | 2000 | 7 | 14 | 0 | 2 |
| SiZr27N | Si:73, Zr:27 | 1000 | 15 | 15 | 0 | 2 |
| SnZnO | Zn:50, O:50 | 1000 | 7 | 0 | 44 | 2 |
| ZnO | Zn | 750 | 10 | 0 | 28 | 2 |
| ZnO' | Zn:50, O:50 | 2000 | 20 | 0 | 0 | 2 |
| $Al_xSi_yN_z$ | Al:90, Si:10 | 2000 | 20 | 15 | 0 | 3 |
| | Al:70, Si:30 | 2000 | 20 | 15 | 0 | 3 |
| | Al:80, Si:20 | 2000 | 20 | 15 | 0 | 3 |
| TiOx | TiOx | 2000 | 30 | 0 | 0 | 2 |
| TiOx' | TiOx | 2000 | 30 | 0 | 2 | 2 |
| NiCrOx | Ni:80, Cr:20 | 70 | 20 | 0 | 2 | 2 |

MATERIAL COMPRISING A FUNCTIONAL MONOLAYER STACK WITH A DIELECTRIC LAYER OF ALUMINUM- AND SILICON-BASED NITRIDE, AND GLAZING COMPRISING THIS MATERIAL

CROSS-REFERENCE TO RELATED APPLICATIONS

This application is the U.S. National Stage of PCT/EP2022/086330, filed Dec. 16, 2022 which in turn claims priority to French patent application number 2114644 filed Dec. 29, 2021. The content of these applications are incorporated herein by reference in their entireties.

The invention relates to a material comprising a substrate coated on one face with a stack of thin layers having reflective properties in the infrared and/or in solar radiation, comprising a single metallic functional layer, in particular based on silver or on metal alloy containing silver, and at least two anti-reflective coatings, said anti-reflective coatings each comprising at least one dielectric layer, said functional layer being arranged between the two anti-reflective coatings.

In this type of stack, the single metallic functional layer is thus arranged between two anti-reflective coatings each comprising at least one layer of which each are made of a nitride type dielectric material, and particularly silicon or aluminum nitride, or oxide. From an optical perspective, the aim of these coatings which surround the metallic functional layer is "to antireflect" this metallic functional layer.

A prior art configuration is known from European patent application No. EP 718 250 in which, on the one hand, a zinc oxide-based layer is located just under and in contact with the metallic functional layer, in the direction of the substrate, then a silicon nitride-based layer under and in contact with this zinc oxide-based layer and wherein, on the other hand, a zinc oxide-based layer is located above, opposite to the substrate, then a dielectric layer, for example silicon nitride-based, is located on and in contact with this zinc oxide-based layer.

This document teaches in particular that the material comprising this stack of thin layers, and the substrate on one face of which said stack is located, can undergo a stress-based heat treatment, of the bending, tempering or annealing type, which leads to a structural modification of the substrate without degrading the optical and thermal properties of the stack.

The invention is based on the discovery of a particular configuration of layers flanking a single metallic functional layer, which makes it possible to obtain good mechanical resistance of the stack allowing washing in a washing machine before heat treatment and preservation of this good mechanical resistance to washing in a washing machine in the event of the material undergoing bending, tempering or annealing type heat treatment before being washed in a washing machine.

One aim of the invention is thus to achieve a novel type of stack of layers with a single functional layer, said stack having, after the material has been heat treated, a low sheet resistance (and therefore low emissivity), as well as a high mechanical resistance, in particular to a test using a brush, allowing it to be subject to washing in a washing machine without heat treatment, or after heat treatment.

Washing in a washing machine is very important to allow glazing to be produced at a reasonable cost.

Furthermore, by improving the mechanical protection within an anti-reflective coating, it is thus possible to reduce the thickness or the thicknesses of any blocking coating(s) protecting a metallic functional layer, below or above, or even not to provide such a blocking coating, and thus obtain a substrate coated with a stack which has a higher light transmission.

In the particular configuration according to the invention, it is proposed to arrange in the anti-reflective coating located above the single metallic functional layer, starting from the substrate, a dielectric layer of nitride based on aluminum and silicon, and, further away, an upper dielectric layer of nitride and/or oxide.

It has been found that this configuration, when the atomic ratio of aluminum relative to the total aluminum and silicon is between 91.0% and 55.0%, or even between 90.0% and 60.0%, enables a nitride dielectric layer with relatively low internal stress to be arranged close to and above the metallic functional layer, and the anti-reflective coating to be supplemented with at least one other dielectric layer so that the nitride dielectric layer with low stress is not alone.

Additionally, the stack of thin layers is cheaper: in particular it is less expensive to deposit, by continuous reactive sputtering, a dielectric layer of nitride based on aluminum and silicon $Al_xSi_yN_z$ than a dielectric layer of aluminum nitride AlN because the deposition rate, in nanometers for the same rate of advance of the substrate, is higher for the aluminum- and silicon-based nitride $Al_xSi_yN_z$ which has an atomic ratio of aluminum relative to the total aluminum and silicon of between 91.0% and 55.0%, or even between 90.0% and 60.0%.

Furthermore, the dielectric layer of nitride based on aluminum and silicon $Al_xSi_yN_z$ having an atomic ratio of aluminum relative to the total aluminum and silicon between 91.0% and 55.0%, or even between 90.0% and 60.0% does not have a negative impact on the sheet resistance of said metallic functional layer, both before and after heat treatment, nor on the optical properties of the material both before and after heat treatment. This atomic ratio of aluminum relative to the total aluminum and silicon may be between 90.0% and 70.0% or between 85.0% and 65.0% or between 85.0% and 70.0%, or even between 83.0% and 60.0% or between 83.0% and 70.0%.

Thus, in its broadest sense, a subject matter of the invention is a material according to claim 1. This material comprises a glass substrate coated on one face with a stack of thin layers having reflective properties in the infrared and/or in solar radiation, comprising a single metallic functional layer, in particular a metallic functional layer based on silver or on metal alloy containing silver, and two anti-reflective coatings, said anti-reflective coatings each comprising at least one dielectric layer, said functional layer being arranged between two anti-reflective coatings, said material being noteworthy in that an anti-reflective coating located further from said face than a functional layer comprises:

- a dielectric layer of nitride based on aluminum and silicon $Al_xSi_yN_z$ with an atomic ratio of aluminum relative to the total aluminum and silicon of between 91.0% and 55.0%, or even between 90.0% and 60.0%, and at least one upper dielectric layer (referred to as "upper" because it belongs to the anti-reflective coating located further from said face than the functional layer and is made of a different material from said dielectric layer of nitride based on aluminum and silicon $Al_xSi_yN_z$), said upper dielectric layer being of nitride and/or oxide and being located further from said substrate face than said dielectric layer of nitride based on aluminum and silicon $Al_xSi_yN_z$, said upper dielectric layer of nitride and/or oxide preferably being in contact above said dielectric layer of nitride based on aluminum and silicon $Al_xSi_yN_z$, and/or said upper dielectric layer being of nitride and being located closer to said substrate face than said dielectric layer of nitride based on aluminum and silicon $Al_xSi_yN_z$, said nitride dielectric layer preferably being in contact beneath said dielectric layer of nitride based on aluminum and silicon $Al_xSi_yN_z$.

Said layer based on aluminum and silicon $Al_xSi_yN_z$ is a barrier layer which prevents external elements from penetrating in the direction of the metallic functional layer. Said dielectric layer of nitride based on aluminum and silicon $Al_xSi_yN_z$ preferably has a physical thickness that is between 5.0 and 100.0 nm, or even between 7.0 and 95.0 nm, or even between 10.0 and 90.0 nm.

Said functional layer is preferably a continuous layer.

Said metallic functional layer preferably has a physical thickness which is between 8.0 and 22.0 nm, or even between 9.0 and 16.4 nm, or even between 9.5 and 12.4 nm.

A metallic functional layer preferably comprises predominantly, at at least an atomic ratio of 50%, at least one of the metals chosen from the list: Ag, Au, Cu, Pt; one, several, or each, metallic functional layer is preferably made of silver.

The expression "metallic layer" should be understood in the present invention to mean that the layer is absorbent as indicated hereinbefore and that it comprises no oxygen atom or nitrogen atom.

As usual, "dielectric layer" within the meaning of the present invention should be understood as meaning that, from the perspective of its nature, the material is "nonmetallic", that is not a metal. In the context of the invention, this term denotes a material exhibiting an n/k ratio over the entire wavelength range of the visible region (from 380 nm to 780 nm) which is equal to or greater than 5.

It is recalled that n denotes the real refractive index of the material at a given wavelength and the k coefficient represents the imaginary part of the refractive index at a given wavelength, the n/k ratio being calculated at the same given wavelength for both n and k.

For the purpose of the present invention, "in contact with" means that no layer is introduced between the two layers in question.

For the purpose of the present invention, "based on" or "-based" means that, for the composition of this layer, the reactive elements oxygen or nitrogen, or both if they are both present, are not taken into consideration, and the non-reactive element or reactive elements (for example silicon or zinc or even aluminum and silicon together), which is stated as constituting the base, is present at more than 85 at % of the total of the non-reactive elements in the layer and can compose 100% of the non-reactive elements in this layer. This expression thus includes what is commonly referred to in the art as "doping", while the doping element, or each doping element, may be present in an amount ranging up to 9.0 at %, but without reaching said 9.0 at % level.

Said upper dielectric layer preferably has a thickness between 5.0 and 75.0 nm, or between 7.0 and 70.0 nm, or even between 10.0 and 65.0 nm. It may have a thickness in particular between 5.0 and 30.0 nm, or between 7.0 and 30 nm, or even between 10.0 and 30.0 nm.

Said upper dielectric layer may be a dielectric layer of nitride based on silicon $Si_yN_z$, which has a deposition rate close to that of said dielectric layer of nitride based on aluminum and silicon $Al_xSi_yN_z$.

Said upper dielectric layer may optionally be an upper dielectric layer of nitride based on silicon-zirconium $Si_{y''}N_{z''}Zr_w$; it then has, preferably, an atomic ratio of silicon to zirconium, y/w, between 2.2 and 5.6, or even between 2.9 and 5.6, or even between 3.0 and 4.8; thus, its index is slightly higher, of the order of 0.2 to 0.5, of that of an upper dielectric of nitride based on silicon $Si_3N_4$; preferably further, said upper dielectric layer of nitride based on silicon-zirconium $Si_{y''}N_{z''}Zr_w$ does not comprise oxygen.

Said upper dielectric layer may be a dielectric layer of oxide, preferably based on zinc and tin, $Sn_tZn_yO$, which has a deposition rate close to that of said dielectric layer of nitride based on aluminum and silicon $Al_xSi_yN_z$.

Said anti-reflective coating comprising said dielectric layer of nitride based on aluminum and silicon $Al_xSi_yN_z$ may comprise, above this dielectric layer of nitride based on aluminum and silicon $Al_xSi_yN_z$ a succession of layers, in particular in contact with each other, of the type: upper dielectric layer of zinc and tin-based oxide/upper dielectric layer of nitride based on silicon-zirconium $Si_{y''}N_{z''}Zr_w$.

Said anti-reflective coating comprising said dielectric layer of nitride based on aluminum and silicon $Al_xSi_yN_z$ may comprise a second dielectric layer of nitride based on aluminum and silicon $Al_xSi_yN_z$. This second dielectric layer of nitride based on aluminum and silicon $Al_xSi_yN_z$ may be of a composition identical or different from a first dielectric layer of nitride based on aluminum and silicon $Al_xSi_yN_z$.

Preferably, said second dielectric layer of nitride based on aluminum and silicon $Al_xSi_yN_z$ has a physical thickness that is between 5.0 and 100.0 nm, or even between 7.0 and 95.0 nm, or even between 10.0 and 90.0 nm. It may in particular be between 5.0 and 30.0 nm, or between 7.0 and 30 nm, or even between 10.0 and 30.0 nm. It can also have an atomic ratio of aluminum relative to the total aluminum and silicon of between 91.0% and 55.0%, or even between 90.0% and 60.0%.

Preferably, said dielectric layer, or said dielectric layers, of nitride based on aluminum and silicon $Al_xSi_yN_z$ does not comprise oxygen; oxygen can have a detrimental effect on the low internal stress.

Preferably, an anti-reflective coating located between said face and said metallic functional layer does not comprise a dielectric layer of nitride based on aluminum and silicon $Al_xSi_yN_z$ which has an atomic ratio of aluminum relative to the total aluminum and silicon of between 91.0% and 55.0%, or even between 90.0% and 60.0%, so as not to have a layer with low internal stress in this anti-reflective coating.

Preferably, said stack of thin layers comprises a final protective layer, furthest away from said face, having a thickness of between 0.5 and 4.5 nm.

In a specific variant that can be combined with the above, the stack can comprise a titanium oxide-based coating comprising, as deposited, an oxidation gradient, located above and in contact with the silver-based functional metal layer, and the part of the oxidation-gradient coating in contact with the functional layer is less oxidized than the part of this coating further away from the functional layer.

In this specific variant, this oxidation-gradient coating can comprise at least two titanium oxide layers, each with different proportions of oxygen. The first titanium oxide layer then preferably has a thickness of between 0.2 and 2.0 nm. The second titanium oxide layer then preferably has a thickness of between 2.0 and 30.0 nm.

In this specific variant, the oxidation-gradient coating can comprise a first layer deposited from a ceramic target, which is in particular sub-stoichiometric, in an atmosphere of which the oxygen percentage by volume flow rate is between 0 and 4%, preferably 0%.

The present invention further relates to a multiple glazing comprising a material according to the invention, and at least one other substrate, the substrates being held together by a frame structure, said glazing producing a separation between an exterior space and an interior space, wherein at least one interlayer gas gap is arranged between the two substrates.

Each substrate can be clear or colored. At least one of the two substrates can particularly be body-colored glass. The choice of the type of coloring will depend on the level of light transmission and/or on the colorimetric appearance sought for the glazing once its manufacture has been completed.

A substrate of the glazing, particularly the substrate carrying the stack, can be bent and/or tempered after the stack has been deposited. It is preferable, in a multiple glazing configuration, for the stack to be arranged so as to be turned on the side of the interlayer gas gap.

The glazing can also be a triple glazing consisting of three glass sheets separated in pairs by a gas gap. In a triple glazing structure, the substrate carrying the stack can be on face 2 and/or on face 5, when it is considered that the incident direction of the sunlight passes through the faces in increasing number order.

A glazing according to the invention may also be a laminated glazing comprising a material according to the invention, at least one other substrate and at least one plastic material interlayer located between said substrates.

Advantageous details and features of the invention will emerge from the following nonlimiting examples, shown using the appended Figures:

FIG. 1 shows a first structure of a functional monolayer stack;

FIG. 2 shows a second structure of a functional bilayer stack;

FIG. 3 shows a double glazing incorporating a stack according to the invention;

FIG. 4 shows a triple glazing incorporating two stacks;

FIG. 5 shows a laminated glazing incorporating a stack according to the invention;

FIG. 6 shows a summary table of functional monolayer examples, some of which comprise a dielectric layer of nitride based on aluminum and silicon $Al_xSi_yN_z$ having an atomic ratio of Al/(Al+Si) of 90%;

FIG. 7 shows a summary table of functional monolayer examples, some of which comprise a dielectric layer of nitride based on aluminum and silicon $Al_xSi_yN_z$ having an atomic ratio of Al/(Al+Si) of 70%;

FIG. 8 shows a further summary table of functional monolayer examples, some of which comprise a dielectric layer of nitride based on aluminum and silicon $Al_xSi_yN_z$ having an atomic ratio of Al/(Al+Si) of 70%;

FIG. 9 shows a summary table of functional bilayer examples, some of which comprise one (or several) dielectric layer(s) of nitride based on aluminum and silicon $Al_xSi_yN_z$ having an atomic ratio of Al/(Al+Si) of 80%; and FIG. 10 shows a summary table of the deposition conditions of the layers of the examples.

In FIGS. 1 to 5, the proportions between the thicknesses of the different layers or the different elements are not rigorously adhered to, in order to facilitate reading.

[FIG. 1] shows a first structure of a monolayer functional stack 14 deposited on a face 29 of a transparent glass substrate 30, wherein the single functional layer 140, in particular based on silver or on a metal alloy containing silver, is arranged between two anti-reflective coatings, the underlying anti-reflective coating 120 located below the functional layer 140, in the direction of the substrate 30, and the overlying anti-reflective coating 160 arranged above the functional layer 140, opposite the substrate 30. These two anti-reflective coatings 120, 160 each comprise at least one dielectric layer 121, 128, 129; 161, 163, 165, 166, 167.

In [FIG. 1], the anti-reflective coating 120 located under the functional layer 140 in the direction of the face 29 comprises:

- an underlayer of zinc-based oxide, ZnO 129 that is located under and in contact with the functional layer 140; and
- a dielectric underlayer of a mixed oxide based on zinc and tin $Sn_iZn_jO$ 128 that is located under and in contact with the underlayer of zinc-based oxide ZnO 129; and
- a dielectric underlayer of nitride based on silicon $Si_xN_y$ 121 which is located under and in contact with the dielectric underlayer of mixed oxide based on zinc and tin $Sn_iZn_jO$ 128.

In [FIG. 1], the anti-reflective coating 160 located above the functional layer 140 opposite the substrate 30 comprises two, three or four dielectric layers:

- a zinc-based oxide layer, ZnO 161;
- a dielectric layer of nitride based on silicon $Si_xN_y$, 163, 167;
- a dielectric layer of oxide based on zinc and tin $Sn_iZn_jO$ 166;
- a dielectric layer of nitride based on aluminum and silicon $Al_xSi_yN_z$ 165, which has a physical thickness that is between 5.0 and 100.0 nm, or even between 10.0 and 90.0 nm.

In [FIG. 1], the functional layer 140 is located indirectly on the underlying anti-reflective coating 120 and indirectly under the overlying anti-reflective coating 160: there is an under-blocking coating 130 located between the underlying anti-reflective coating 120 and the functional layer 140 and an over-blocking coating 150 located between the functional layer 140 and the anti-reflective coating 160. However, such an under-blocking coating and/or such an over-blocking coating may not be present.

[FIG. 2] shows a structure of a functional bilayer stack 14 according to the invention, deposited on a face 29 of a transparent glass substrate 30, wherein the two functional layers 140, 180, in particular based on silver or on a metal alloy containing silver, are each arranged between two anti-reflective coatings: the underlying anti-reflective coating 120 is located below the functional layer 140 closest to the face 29 of the substrate 30, the intermediate anti-reflective coating 160 is located between the two functional layers and the overlying anti-reflective coating 200 is located above the functional layer 180 furthest from the face 29 of the substrate 30. These three anti-reflective coatings 120, 160, 200 each comprise at least one dielectric layer 121, 128, 129; 165, 166, 167, 165; 201, 205, 207.

In [FIG. 2]:

- the functional layer 140 closest to the substrate is located directly on the underlying anti-reflective coating 120 and indirectly under the overlying anti-reflective film 160: there is an over-blocking coating 150 located between the functional layer 140 and the anti-reflective coating 160; there is no under-blocking coating located between the underlying anti-reflective coating 120 and the functional layer 140;
- the functional layer 180 furthest from the substrate: the functional layer 180 is in direct contact with the anti-reflective coating 160 located directly below and indirectly under the anti-reflective coating 200 located above: there is an over-blocking coating 190 located between the functional layer 180 and the anti-reflective coating 200; there is no under-blocking coating located between the underlying anti-reflective coating 160 and the functional layer 180.

However, it could be envisaged that an under-blocking coating is further located under one, or each, functional layer 140, 180, or that there is one, or several, under-blocking coating(s) and one, or no, over-blocking coating, or even that there is no under-blocking or over-blocking coating.

In [FIG. 2], the anti-reflective coating 120 located under the functional layer 140 in the direction of the substrate 30 comprises:

an underlayer of zinc-based oxide, ZnO 129 that is located under and in contact with the functional layer 140; and a dielectric underlayer of a mixed oxide based on zinc and tin $Sn_iZn_jO$ 128 that is located under and in contact with the underlayer of zinc-based oxide ZnO 129; and a dielectric underlayer of nitride based on silicon $Si_xN_y$, 121 and which is located under and in contact with the dielectric underlayer of mixed oxide based on zinc and tin $Sn_iZn_jO$ 128.

The anti-reflective coating located under the second functional layer 180 comprises, in the direction of said substrate two, three or four dielectric layers 165, 166, 167, 165', 169:

a dielectric layer of nitride based on aluminum and silicon $Al_xSi_yN_z$ 165, 165', which has a physical thickness that is between 5.0 and 100.0 nm, or even between 10.0 and 90.0 nm, a dielectric layer of nitride based on silicon $Si_xN_y$, 167, a dielectric layer of mixed oxide based on zinc and tin $Sn_iZn_jO$ 166, which has a physical thickness that is between 3.0 and 50.0 nm, or even between 4.0 and 40.0 nm, or even between 5.0 and 35.0 nm, an underlayer of zinc-based oxide, ZnO 169 which is located under and in contact with the functional layer 180.

In [FIG. 2], the anti-reflective coating 200 located above the functional layer 180 furthest from the face 29 comprises two or three dielectric layers 201, 205, 207:

a zinc-based oxide layer, ZnO 201;

a dielectric layer of nitride based on aluminum and silicon $Al_xSi_yN_z$ 165, which has a physical thickness that is between 5.0 and 100.0 nm, or even between 10.0 and 90.0 nm;

a dielectric layer of nitride based on silicon $Si_xN_y$, 207.

The anti-reflective coating 160 located above the single metallic functional layer in [FIG. 1], or the anti-reflective coating 200 which is located above the metallic functional layer furthest from the face 29 when there are several metallic functional layers, may be covered by a final protective layer 300, referred to as an "overcoat", which is the layer of the stack furthest from the face 29. It may, for example, be a layer based on titanium oxide or of titanium oxide.

Such a stack of thin layers 14, 14' can be used in a multiple glazing or in a laminated glazing 100", producing a separation between an exterior space ES and an interior space IS; this glazing can have a structure:

of double glazing 100, as shown in [FIG. 3]: this glazing then consists of two substrates 10, 30 which are held together by a frame structure 90 and which are separated from one another by an interlayer gas gap 15; or of triple glazing 100', as shown in [FIG. 4]: this glazing then consists of three substrates 10, 20, 30, separated in pairs by an intermediate gas gap 15, 25, the whole assembly being held together by a frame structure 90; or of laminated glazing 100", as shown in [FIG. 5]: this glazing comprises the substrate 30 which forms an exterior substrate, a substrate 50 which forms an interior substrate, as well as a plastic interlayer 40 arranged between these two substrates, in contact therewith.

In these figures, the incident direction of sunlight entering the building is shown by the double arrow on the left.

It may also be envisaged that in a double glazing or triple glazing structure, one of the substrates has a laminated structure.

In [FIG. 3], the stack 14, 14' of thin layers can be positioned on face 3 (on the sheet furthest towards the interior of the building, considering the incident direction of sunlight entering the building and on the face thereof which is facing the gas gap), that is on an interior face 29 of the substrate 30 in contact with the interlayer gas gap 15, the other face 31 of the substrate 30 being in contact with the interior space IS. However, the stack 14 of thin layers may be positioned on face 2, on the sheet furthest towards the exterior of the building when considering the incident direction of the sunlight entering the building and on the face thereof which is facing the gas gap (not shown).

In [FIG. 4] there are two stacks of thin layers, preferably identical:

one stack 13 of thin layers is positioned on face 2 (on the sheet furthest towards the exterior of the building when considering the incident direction of sunlight entering the building and on the face thereof which is facing the gas gap),that is on an interior face 11 of the substrate 10 in contact with the interlayer gas gap 15, the other face 9 of the substrate 10 being in contact with the exterior space ES;

and one stack 14, 14' of thin layers is positioned on face 5 (on the sheet furthest towards the interior of the building when considering the incident direction of sunlight entering the building and on the face thereof which is facing the gas gap),that is on an interior face 29 of the substrate 30 in contact with the interlayer gas gap 25, the other face 31 of the substrate 30 being in contact with the interior space IS.

In [FIG. 5], the stack of thin layers 14, 14' is located on an interior face of the exterior substrate, but it may also be located on an interior face of the interior substrate.

The interlayer of plastic material 40 may be, for example, flexible polyurethane, a plasticizer-free thermoplastic such as ethylene/vinyl acetate copolymer (EVA) or polyvinyl butyral (PVB). The plastic material interlayer 40 has, for example, a thickness of between 0.2 mm and 1.1 mm, or even between 0.38 mm and 0.76 mm. The exterior substrate has a face 31 which is turned toward the exterior space ES and a face 29 oriented toward the interior space IS.

The plastic material interlayer 40 connects the exterior substrate to the interior substrate. A glazing is said to be "laminated" in the sense that there is no gaseous space or empty space between the at least three sheets that constitute it in the exterior-interior transverse direction. Although this is not illustrated, the glazing may in particular comprise two plastic interlayer sheets.

Three series of examples were produced:

a first series, summarized in the table of [FIG. 6], was produced on the basis of the functional monolayer stack structure shown in [FIG. 1];

a second series, summarized in the table of [FIG. 7], was produced on the basis of the functional monolayer stack structure shown in [FIG. 1];

a third series, summarized in the table of [FIG. 8], was produced on the basis of the functional monolayer stack structure shown in [FIG. 1];

a fourth series, summarized in the table of [FIG. 9], was produced on the basis of the functional bilayer stack structure shown in [FIG. 2].

For each of these tables, the examples are numbered in the first row, at the top, and the first column of the table, on the left, indicates the reference of the layer related to [FIG. 1] or [FIG. 2], respectively. The second column indicates the composition of the layer and the values indicated are the thicknesses, in nanometers. A dash indicates that the layer is not present for this example.

The table of [FIG. 10] summarizes the deposition conditions for the layers of these examples (the compositions of the layers are indicated in the first column, in reference to the second columns of the tables of [FIGS. 6, 7, 8 and 9]), with:

for the dielectric layers of nitride based on silicon $Si_xN_y$, 121, 163, 167, 207: $Si_3N_4$, for the first row of aluminum- and silicon-based nitride $Al_xSi_yN_z$: the deposition conditions for the dielectric layer of nitride based on aluminum and silicon $Al_xSi_yN_z$ 165 for the first series of examples, that of [FIG. 6], with a metal target containing 90% Al and 10% Si, for the second row of aluminum- and silicon-based nitride $Al_xSi_yN_z$: the deposition conditions for the dielectric layer of nitride based on aluminum and silicon $Al_xSi_yN_z$ 165 for the second series of examples, that of [FIG. 7], with a metal target containing 70% Al and 30% Si, and for the third row of aluminum- and silicon-based nitride $Al_xSi_yN_z$: the deposition conditions for the dielectric layer of nitride based on aluminum and silicon $Al_xSi_yN_z$ 165, 165' and 205 for the third and fourth series of examples, those of [FIG. 8] and [FIG. 9], with a metal target containing 80% Al and 20% Si.

The titanium oxide TiOx layers are deposited from a TiOx ceramic target, x being between 1.8 and 2.0, with or without oxygen in the deposition atmosphere.

In this table of [FIG. 10]:

T is the composition of the target, as an atomic percentage,

P is the electrical power, in Watts, applied to the target,

Ar (sccm) is the argon flow added to the material deposition chamber, $N_2$ (sccm) is the nitrogen flow added to the material deposition chamber, $O_2$ (sccm) is the oxygen flow added to the material deposition chamber, and P' is the pressure in the material deposition chamber, in μbar.

The stacks of the examples presented in the tables were deposited on a transparent glass substrate, and the mechanical resistance of the materials thus obtained underwent a mechanical resistance test called the "Erichsen Brush test" or "EBT".

This test consists in depositing a sample in a cold water bath and, using a machine, rubbing the surface of the sample with a bristle brush made of a polymer material, in a reciprocating movement (1 back-and-forth motion=1 movement). Three brushing cycles are applied over three different areas, corresponding, for each area, to a number of movements of the brush: 50 movements, 100 movements and 300 movements.

Furthermore, three other samples of the same material were subjected to heat treatment in order to simulate tempering under normal conditions in the field, then, only after this heat treatment, the EBT test: the samples are then subjected to heat treatment for about 10 minutes at a temperature of about 650° C., followed by cooling to ambient air (about 20° C.) and then the EBT test.

The EBT test before tempering gives a good indication of the ability of the glazing to be scratched during a washing operation in the washing machine. The EBT test after heat treatment gives a good indication of the ability of the glazing to be scratched during a washing operation in the washing machine after tempering. The washing operation in the washing machine is an operation that saves time and is more effective when using substrates coated with a stack to manufacture windows: it is faster and more efficient than manual washing by an operator.

For each of the six samples of each material, the test is assessed with the naked eye, by an experienced operator, who classifies each sample into one of the following three categories:

no scratch, a few faint and non-continuous scratches, numerous faint, non-continuous or continuous scratches.

For the first series of examples, examples 1 to 3 passed the EBT test before heat treatment; there were no scratches before heat treatment (even for example 3, without a protective layer 300), nor after 50 movements, nor after 300 movements.

Among examples 1, 2 and 3, only example 2 passed the EBT test after heat treatment: for the EBT test on examples 1 and 3 after heat treatment, numerous faint, non-continuous or continuous scratches were observed, both after 50 movements and after 100 movements and after 300 movements.

For examples 1 and 2, the protective layer 300 confers "dry" mechanical protection, that is for handling substrates coated with stacks, but does not confer effective protection against machine washing.

Examples 10 to 18 all passed the EBT test before heat treatment and the EBT test after heat treatment: for each of these examples, there were no scratches before heat treatment, nor after 50 movements, nor after 300 movements, and there were no scratches after heat treatment, nor after 50 movements, nor after 100 movements, nor after 300 movements. The stacks of all these examples, (even ex. 11, without a protective layer 300), are correctly protected against machine washing.

Ex. 1 presents, before heat treatment, a sheet resistance of 5.7 ohms/square and a light transmission of 85.8%. After heat treatment, it has a sheet resistance of 4.3 ohms/square and a light transmission of 88.0%.

Ex. 2 presents, before heat treatment, a higher sheet resistance of 6.5 ohms/square and a lower light transmission of 83.8%. It has, after heat treatment, a higher sheet resistance than that of ex. 1, of 4.8 ohms/square and a lower light transmission, of 87.1%.

Ex. 3 has, before heat treatment, a sheet resistance that is almost identical to that of example 1 of 5.5 ohms/square and a higher light transmission than that of example 1 of 86.8% due to a thinner over-blocking coating. After heat treatment, it has a sheet resistance that is almost identical to that of example 1 of 4.1 ohms/square and a higher light transmission than that of example 1 of 88.9%.

Before heat treatment, ex. 12 has a sheet resistance that is almost identical to that of example 1 of 5.4 ohms/square and an almost identical light transmission of 86.0%. After heat treatment, it has an improved (lower) sheet resistance of 4.2 ohms/square and an almost identical light transmission of 88.1%.

Before heat treatment, ex. 14, with a thinner over-blocking coating than that of ex. 12, has an almost identical sheet resistance of 5.3 ohms/square and an almost identical light transmission of 86.9%. After heat treatment, it has an improved (lower) sheet resistance of 4.0 ohms/square and a higher light transmission of 89.0%.

Thus, the presence of the dielectric layer of nitride based on aluminum and silicon $Al_xSi_yN_z$ 165, with a physical thickness of 5.0 nm or more, thanks to the best mechanical protection that it confers, makes it possible to provide a thinner over-blocking coating 150, and thus makes it possible to obtain a higher light transmission.

For the second series of examples, examples 21, 22, 25 and 29 all passed the EBT test before heat treatment and the EBT test after heat treatment; for each of these examples, there were no scratches before heat treatment, nor after 50 movements, nor after 300 movements, and there were no scratches after heat treatment, nor after 50 movements, nor after 100 movements, nor after 300 movements. The stacks of these examples are correctly protected against machine washing.

It has thus been surprisingly observed that a dielectric layer of nitride based on aluminum and silicon $Al_xSi_yN_z$ 165 preferably having a physical thickness that is between 5.0 and 100.0 nm, or even between 7.0 and 95.0 nm, or even between 10.0 and 90.0 nm, having an atomic ratio of aluminum relative to the total aluminum and silicon comprised between 91.0% and 65.0%, or even between 90.0% and 70.0% and located in the anti-reflective coating 160 located further from the face 29 than the functional layer 140 enhances the mechanical resistance after heat treatment and confers effective protection against machine washing when an upper dielectric layer of nitride and/or oxide is located above, further from the face 29 than the dielectric layer of nitride based on aluminum and/or silicon $Al_xSi_yN_z$ 165.

This effect is obtained in particular with the upper dielectric layer of nitride when it is an upper dielectric layer of nitride based on silicon $Si_{y'}N_{z'}$ 167 and when the upper dielectric layer is a zinc and tin-based oxide $Sn_tZn_yO$ 166.

A physical thickness of a dielectric layer of nitride based on aluminum and silicon $Al_xSi_yN_z$ 165 which is between 5.0 and 30.0 nm gives, in particular, very good mechanical resistance results after heat treatment for stacks with a single metallic functional layer 140.

For the third series of examples, examples 33, 34 and 35 passed the EBT test before heat treatment and the EBT test after heat treatment; for each of these examples, there were no scratches before heat treatment, nor after 50 movements, nor after 300 movements, and there were no scratches after heat treatment, nor after 50 movements, nor after 100 movements, nor after 300 movements. The stacks of these examples are correctly protected against machine washing. Example 4 passed the EBT test before heat treatment but not the EBT test after heat treatment, example 5 passed the EBT test after heat treatment but not the EBT test before heat treatment, and example 4' failed both the EBT test before heat treatment and the EBT test after heat treatment.

For examples 4', 33 et 34, the stacks comprise a titanium oxide-based double over-blocking coating 150-150' (oxygen-gradient coating) comprising at least two titanium oxide layers with different proportions of oxygen. The first layer is deposited in contact with the silver functional layer and in an oxygen-free atmosphere at a thickness of 1 nanometer. This layer is therefore under-oxidized. The second titanium oxide-based layer is deposited in an atmosphere with 5% oxygen by volume flow rate, and has a thickness of 4 nm. This layer is therefore more oxidized than the first.

For examples 5 and 35, the stacks comprise a double under-blocking coating 130-130' comprising a nickel-chromium oxide-based layer in contact with the zinc oxide-based wetting layer 129, followed by a zinc oxide-based layer in contact with the silver functional layer.

A fourth series of examples was produced on the basis of the stack structure shown in [FIG. 2].

Example 6 passed the EBT test before heat treatment, but not the EBT test after heat treatment; there were no scratches before heat treatment, nor after 50 movements, nor after 300 movements but, for the EBT test after heat treatment, numerous faint, non-continuous or continuous scratches were observed, both after 50 movements and after 100 movements and after 300 movements. Example 6 is not suitable for machine washing after heat treatment.

Examples 41 to 49 all passed the EBT test before heat treatment and the EBT test after heat treatment: for each of these examples, there were no scratches before heat treatment, nor after 50 movements, nor after 300 movements, and there were no scratches after heat treatment, nor after 50 movements, nor after 100 movements, nor after 300 movements. The stacks of all these examples are correctly protected against machine washing.

It has thus surprisingly been observed that a dielectric layer of nitride based on aluminum and silicon $Al_xSi_yN_z$ 165, 205 preferably having a physical thickness that is between 5.0 and 100.0 nm, or even between 10.0 and 90.0 nm, having an atomic ratio of aluminum relative to the total aluminum and silicon comprised between 91.0% and 65.0%, or even between 90.0% and 70.0% and located in the anti-reflective coating 160 and/or 200 located further from the face 29 than the functional layer 140 or 180 enhances the mechanical resistance after heat treatment.

This effect is notably obtained when an upper dielectric layer of nitride and/or oxide is located above, further from the face 29 than the dielectric layer of nitride based on aluminum and silicon $Al_xSi_yN_z$ 165, 205. This effect is obtained in particular with the upper dielectric layer of nitride when it is an upper dielectric layer of silicon-based nitride $Si_{y'}N_{z'}$ 167, 207.

A physical thickness of a dielectric layer of nitride based on aluminum and silicon $Al_xSi_yN_z$ 165 which is between 5.0 and 30.0 nm gives, in particular, very good mechanical resistance results after heat treatment for the stacks with two metallic functional layers 140, 180, or for the stacks with more than two metallic functional layers 140, 180.

Some examples were subject to washing in a washing machine, then assembled to form laminated glazing 100" (with a lamination heat treatment step) and then underwent a mechanical adhesion test known as a Pummel test, consisting of assessing the adhesion between the PVB and each of the substrates (knowing that the presence of the layers at the substrate/PVB interface may modify it negatively).

A Pummel test machine is disclosed in U.S. Pat. No. 5,543,924.

The Pummel test consists in arranging the laminated glazings incorporating a substrate coated with a stack of thin layers in a refrigerated chamber at −20° C. for four hours, and then taking a 500-gram hammer with a hemispherical head and hitting the glass therewith as soon as it leaves the refrigerated chamber, the glass being placed on a stand inclined at 45° relative to the horizontal and installed in such a way that the median plane of the glass forms an angle of 5° with the plane of inclination of the stand (the glazing is placed on the stand, holding it solely by its base against the stand.) The laminated glazing is struck with the hammer along a line parallel to the base of the glazing. The adhesion is then estimated by comparing with specimens, once the laminated glazings are at room temperature again. The "score" of the laminated glazings is then evaluated:

between 0 and 1, the laminated glazing has no glass/PVB adhesion, between 2 and 3, the adhesion is average, between 4 and 6, the adhesion is good, beyond 6, it is excellent.

Ex. 41 and 48 were tested in this laminated configuration and they all obtained a score between 6 and 7.

The present invention is described in the preceding text by way of example. Of course, those skilled in the art are capable of implementing different variants of the invention without departing from the scope of the patent such as defined by the claims.

The invention claimed is:

1. A material comprising a glass substrate, coated on one face with a stack of thin layers having reflective properties in the infrared and/or in solar radiation, comprising a single metallic functional layer, said functional layer being arranged between two anti-reflective coatings, wherein an anti-reflective coating located further from said face than the functional layer comprises:

a dielectric layer of nitride based on aluminum and silicon $Al_xSi_yN_z$ with an atomic ratio of aluminum relative to the total aluminum and silicon of between 91.0% and 55.0%, and at least one upper dielectric layer, said at least one upper dielectric layer being a first upper dielectric layer of nitride and/or oxide and being located further from said face than said dielectric layer of nitride based on aluminum and silicon $Al_xSi_yN_z$, and/or said at least one upper dielectric layer being a second upper dielectric layer of nitride and being located closer to said face than said dielectric layer of nitride based on aluminum and silicon $Al_xSi_yN_z$.

2. The material according to claim 1, wherein said at least one upper dielectric layer has a physical thickness between 5.0 and 75.0 nm.

3. The material according to claim 1, wherein said at least one upper dielectric layer is a dielectric layer of silicon-based nitride $Si_yN_z$.

4. The material according to claim 1, wherein said first upper dielectric layer is an oxide dielectric layer.

5. The material according to claim 1, wherein said dielectric layer of nitride based on aluminum and silicon $Al_xSi_yN_z$ has a physical thickness which is between 5.0 and 100.0 nm.

6. The material according to claim 1, wherein said dielectric layer of nitride based on aluminum and silicon $Al_xSi_yN_z$ does not comprise oxygen.

7. The material according to claim 1, wherein an anti-reflective coating located between said face and said metallic functional layer does not comprise a dielectric layer of nitride based on aluminum and silicon $Al_xSi_yN_z$ which has an atomic ratio of aluminum relative to the total aluminum and silicon of between 91.0% and 55.0%.

8. The material according to claim 1, wherein said stack of thin layers comprises a final protective layer, furthest away from said face, having a thickness between 0.5 and 4.5 nm.

9. A multiple glazing comprising a material according to claim 1, and at least one other substrate, the glass substrate and the at least one other substrate being held together by a frame structure, said multiple glazing producing a separation between an exterior space and an interior space, wherein at least one interlayer gas gap is arranged between the glass substrate and the at least one other substrate.

10. A laminated glazing comprising a material according to claim 1, at least one other substrate and at least one interlayer sheet of plastic material located between said glass substrate and the at least one other substrate.

11. The material according to claim 1, wherein the stack of thin layers includes a metallic functional layer based on silver or on metal alloy containing silver and two anti-reflective coatings, said two anti-reflective coatings each comprising at least one dielectric layer.

12. The material according to claim 1, wherein the atomic ratio of aluminum relative to the total aluminum and silicon is between 90.0% and 60.0%.

13. The material according to claim 1, wherein said first upper dielectric layer of nitride and/or oxide is in contact above said dielectric layer of nitride based on aluminum and silicon $Al_xSi_yN_z$.

14. The material according to claim 1, wherein said second nitride dielectric layer is in contact beneath said dielectric layer of nitride based on aluminum and silicon $Al_xSi_yN_z$.

15. The material according to claim 2, wherein said at least one upper dielectric layer has a physical thickness between 7.0 and 70.0 nm.

16. The material according to claim 15, wherein said at least one upper dielectric layer has a physical thickness between 10.0 and 65.0 nm.

17. The material according to claim 4, wherein said first upper dielectric layer is an oxide dielectric layer based on zinc and tin.

18. The material according to claim 5, wherein said dielectric layer of nitride based on aluminum and silicon $Al_xSi_yN_z$ has a physical thickness which is between 7.0 and 95.0 nm.

19. The material according to claim 18, wherein said dielectric layer of nitride based on aluminum and silicon $Al_xSi_yN_z$ has a physical thickness which is between 10.0 and 90.0 nm.

20. The material according to claim 7, wherein the atomic ratio of aluminum relative to the total aluminum and silicon is between 90.0% and 60.0%.

* * * * *